US007170661B2

(12) United States Patent
Ogasawara et al.

(10) Patent No.: US 7,170,661 B2

(45) Date of Patent: Jan. 30, 2007

(54) HOLOGRAM RECORDING MEDIUM AND RECORDING AND REPRODUCING SYSTEM

(75) Inventors: Masakazu Ogasawara, Tsurugashima (JP); Michio Sakano, Tsurugashima (JP); Satoru Tanaka, Tsurugashima (JP); Akihiro Tachibana, Tsurugashima (JP); Yoshihisa Kubota, Tsurugashima (JP); Yoshihisa Itoh, Tsurugashima (JP); Michikazu Hashimoto, Tsurugashima (JP); Kazuo Kuroda, Tsurugashima (JP); Satoshi Sugiura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/000,523

(22) Filed: Dec. 1, 2004

(65) Prior Publication Data

US 2005/0141067 A1 Jun. 30, 2005

(30) Foreign Application Priority Data

Dec. 9, 2003 (JP) ............................ 2003-409766

(51) Int. Cl.

*G03H 1/00* (2006.01)
*G03H 1/26* (2006.01)
*G02B 5/18* (2006.01)
*G02B 27/42* (2006.01)

(52) U.S. Cl. ........................... 359/22; 359/558; 359/4; 369/112.16

(58) Field of Classification Search .................. 359/22, 359/3, 4, 7

See application file for complete search history.

(56) References Cited

U.S. PATENT DOCUMENTS

| | | | |
|---|---|---|---|
| 5,917,798 A | 6/1999 | Horimai et al. | |
| 2002/0093902 A1* | 7/2002 | Hirai et al. | 369/112.17 |
| 2004/0165518 A1* | 8/2004 | Horimai et al. | 369/94 |
| 2004/0233831 A1* | 11/2004 | Matsumoto et al. | 369/275.1 |
| 2005/0141067 A1* | 6/2005 | Ogasawa et al. | 359/22 |

FOREIGN PATENT DOCUMENTS

| | | | |
|---|---|---|---|
| EP | 1 324 322 | 7/2003 | |
| JP | 63-262614 | 10/1988 | |
| JP | 7-210067 | 8/1995 | |
| JP | 9-90130 | 4/1997 | |
| JP | 11-311937 | 11/1999 | |
| JP | 2004-185707 | * 7/2004 | 369/94 |

* cited by examiner

*Primary Examiner*—Fayez G. Assaf
(74) *Attorney, Agent, or Firm*—Drinker Biddle & Reath LLP

(57) ABSTRACT

A hologram recording medium is a hologram recording medium which is irradiated with light for recording information therein or reproducing information therefrom. The hologram recording medium has a recording layer made of a photo-sensitive material capable of preserving an optical interference pattern, a reflective layer disposed on one side of the recording layer opposite to the side on which an light beam impinges, and a quarter wavelength plate interposed between the recording layer and the reflective layer.

13 Claims, 15 Drawing Sheets

2
HG
8
7
6
5
4
3
GT

HOLOGRAM RECORDING MEDIUM AND RECORDING AND REPRODUCING SYSTEM

BACKGROUND OF THE INVENTION

1. Field of the Invention

The present invention relates to a hologram recording medium on which information is optically recorded or reproduced, such as an optical disc, an optical card and the like, and more particularly, to a hologram recording medium which has a recording layer irradiated with a light beam for recording or reproducing information, and a recording and reproducing system.

2. Description of the Related Art

The hologram has drawn attention because of its ability to record two-dimensional data signals at a high density, in order to increase the density of recording information. The hologram is characterized by volumetrically recording a wavefront of light which carries recording information on a hologram recording medium made of a photosensitive material such as a photo-refractive material as a change in refractive index. For example, a recording and reproducing system which utilizes the hologram recording medium as a disc (hologram disc) has been developed (see Laid-open Japanese Patent Application Kokai No. 11-311937).

FIG. 1 shows part of a hologram disc. This hologram disc is comprised of a transparent substrate, and a hologram layer, a reflective film, and a protective layer laminated in order on the transparent substrate. The reflective film of the hologram disc has a reflective surface which is formed with servo areas 6 at predetermined angular intervals, and data area 7 in a sector area between adjacent servo areas 6.

In the hologram recording system, a hologram disc with reference light which is converged on the reflective film through the recording layer as a spot, and the reference light reflected by the reflective film diverges to pass through the recording layer, and simultaneously, information light, which carries information to be recorded, is passed through the recording layer. In this way, in the recording layer, the reflected reference light interferes with the information light to form an interference pattern to volumetrically record hologram within the recording layer. The holograms of the interference pattern are recorded in the recording layer adjacent to each other, overlapping in sequence. Then, the reference light is irradiated to detect and demodulate reproduced light restored from each hologram to reproduce recorded information.

In the hologram disc shown in Laid-open Japanese Patent Application No. 11-311937, on which the reference light and information light coaxially impinge from the same side, it is difficult to separate the reference light reflected on the reflective film from the reproduced light from the holograms during reproduction of information. This causes the performance of reading a reproduced signal to be degraded. To solve these problems, an objective lens 12 is immediately preceded by a bisect azimuth rotator 14 which has a pupil divided into two areas, each of which has optical rotating directions different by 90° from each other, as shown in FIG. 1, to prevent the reference light from impinging on a photodetector.

However, the conventional method involves integrally driving the bisect azimuthrotator 14 and objective lens 12, causing an increase in cost. The conventional method also has a problem of a deteriorated recording characteristic from reproduced light corresponding to the vicinity of the division boundary of the bisect azimuth rotator 14.

SUMMARY OF THE INVENTION

It is therefore an exemplary object of the present invention to provide a hologram recording medium and a recording and reproducing system which enable stable recording or reproduction without degradation of the recording characteristic.

A hologram recording medium according to the present invention is a hologram recording medium which is irradiated with light for recording information thereon and reproducing information therefrom, characterized by including a recording layer made of a photo-sensitive material, a reflective layer disposed on one side of the recording layer opposite to the side which is irradiated with light, and a quarter wavelength plate interposed between the recording layer and the reflective layer.

A hologram recording and reproducing system according to the present invention is characterized by including:

a hologram recording medium having a recording layer made of a photo-sensitive material capable of preserving an optical interference pattern, a reflective layer disposed on the opposite side of the recording layer from a side on which a light beam impinges, and a quarter wavelength plate interposed between the recording layer and the reflective layer;

a support for mountably supporting the hologram recording medium;

a light source for generating a coherent reference beam;

a signal light generator including a spatial light modulator for spatially modulating the reference beam in accordance with recording information to generate a signal beam;

an interference unit for irradiating the reflective layer of the hologram recording medium with the signal beam and the reference beam to form a diffraction grating area by a light interference pattern within the recording layer of the hologram recording medium, and for irradiating the reference beam to the diffraction grating area to generate a reproduced wave corresponding to the signal beam;

a separator for separating the reproduced wave from return light of the reference light reflected from the reflective layer back to the interference unit; and a detector for detecting recorded information formed by the reproduced wave.

A hologram reproducing system according to the present invention is characterized by including:

a hologram recording medium having a recording layer made of a photo-sensitive material capable of preserving an optical interference pattern, a reflective layer disposed on the opposite side of said recording layer from a side on which a light beam impinges, and a quarter wavelength plate interposed between said recording layer and said reflective layer;

a support for mountably supporting said hologram recording medium;

a light source for generating a coherent reference beam;

an interference unit for irradiating the reference beam to a diffraction grating area formed within said recording layer of said hologram recording medium in accordance with recording information to generate a reproduced wave corresponding to the signal beam;

a separator for separating said reproduced wave from return light of the reference light reflected from said reflective layer back to said interference unit; and a detector for detecting recorded information formed by the reproduced wave.

A hologram recording system according to the present invention is characterized by including:

a hologram recording medium having a recording layer made of a photo-sensitive material capable of preserving an optical interference pattern, a reflective layer disposed on the opposite side of said recording layer from a side on which a light beam impinges, and a quarter wavelength plate interposed between said recording layer and said reflective layer;

a support for mountably supporting said hologram recording medium;

a light source for generating a coherent reference beam;

a signal light generator including a spatial light modulator for spatially modulating the reference beam in accordance with recording information to generate a signal beam; and an interference unit for irradiating said reflective layer of said hologram recording medium with the signal beam and the reference beam to form a diffraction grating area by a light interference pattern within said recording layer of said hologram recording medium.

DETAILED DESCRIPTION OF THE INVENTION

In the following, embodiments of the present invention will be described with reference to the drawings.

<Recording Medium>

Figure 1:
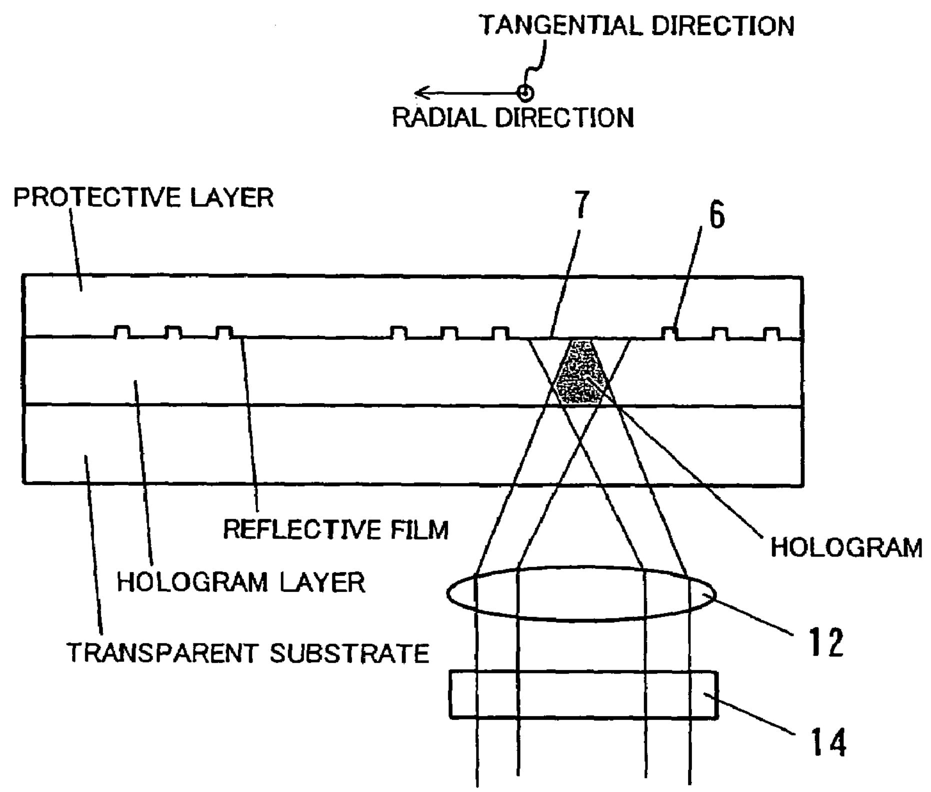
FIG. 1 is a partial cross-sectional view generally showing the structure of a guide track on a conventional hologram disc.
Figure 2:
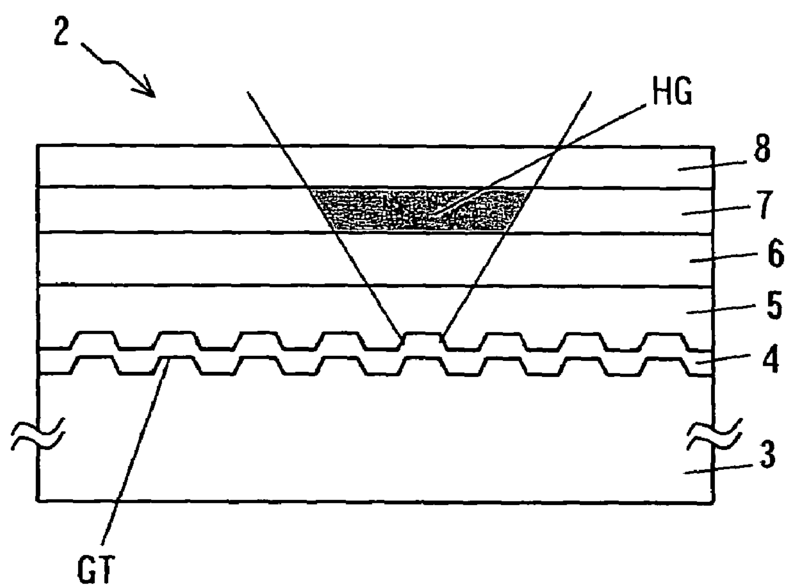
FIG. 2 is a partial cross-sectional view generally showing a hologram recording medium according to one embodiment of the present invention.

FIG. 2 shows a recording disc in the form of an optical disc according to an exemplary embodiment.

The hologram recording medium comprises a substrate 3, and a reflective layer 4, a separation layer 5, a quarter (¼) wavelength plate 6, a recording layer 7, and protective layer 8 laminated on the substrate 3 from an opposite side to a side from which reference light impinges. In the hologram recording medium 2, the quarter wavelength plate 6 is disposed between the recording layer 7 and the reflective layer 4.

The substrate 3 is a parallel flat plate made, for example, of a glass or a plastic material which has been previously formed with addresses and track structures. The reflective layer 4, which is made, for example, of a metal such as aluminum or a multi-layer dielectric film, is formed with a plurality of guide tracks GT, in the form of grooves, that extend spaced away from each other without intersection. The reflective layer 4 functions as a guiding layer. Tracks are provided for servo control, such as at least tracking servo. The recording layer 7 is made of a photosensitive material, for example, a photo-refractive material, a hole burning material, a photo-chromic material, or the like which can preserve optical interference patterns. A hologram HG is recorded in the recording layer 7 above the guide track GT. The separation layer 5 and protective layer 8 are made of an optically transparent material, and function to planarize the laminate and protect the recording layer and the like.

The quarter wavelength plate 6 is an optical element which can convert linearly polarized light to circularly polarized light when it is disposed such that the polarization plane of incident light is at an angle of 45 degrees to the optical axis (crystal axis) of the wavelength plate. Generally, the wavelength plate is known as an optical element that cuts quartz, which is auniaxial crystal, in parallel with the crystal axis to give a phase difference (retardation) to incident light, i.e., a birefringence element which causes a phase difference between S-polarized light and P-polarized light when light at a particular wavelength passes therethrough, and includes a quarter wavelength plate, a half wavelength plate, and the like.

An example of the quarter wavelength plate 6 is made up of two quartz plates (artificial quartz or the like), which have been ground to respective set thicknesses corresponding to particular wavelengths, bonded with their optical axes of crystal oriented orthogonal to each other. The quarter wavelength plate 6 can be made of an organic material such as polyimide or the like, other than inorganic materials. Since the amount of birefringence exhibited by a constituent material depends on the wavelength and also varies in phase difference, an appropriate material should be selected for a used wavelength in order to provide a predetermined phase difference.

In the quarter wavelength plate 6, when linearly polarized light is made incident at an angle of 45 degrees to the crystal axis, circularly polarized light exits the quarter wavelength plate 6. On the other hand, when a circularly polarized light is incident, linearly polarized light at an angle of 45 degrees exits the quarter wavelength plate 6. Thus, return light of the circularly polarized light again passes through the quarter wavelength plate to produce linearly polarized light which is shifted by 90 degrees from the original polarization plane. In this way, the return light can be prevented by passing the circularly polarized light through an optical separation element such as a polarization beam splitter or the like. This technique can be used when an elliptically polarized light is converted to linearly polarized light.

Figure 3:
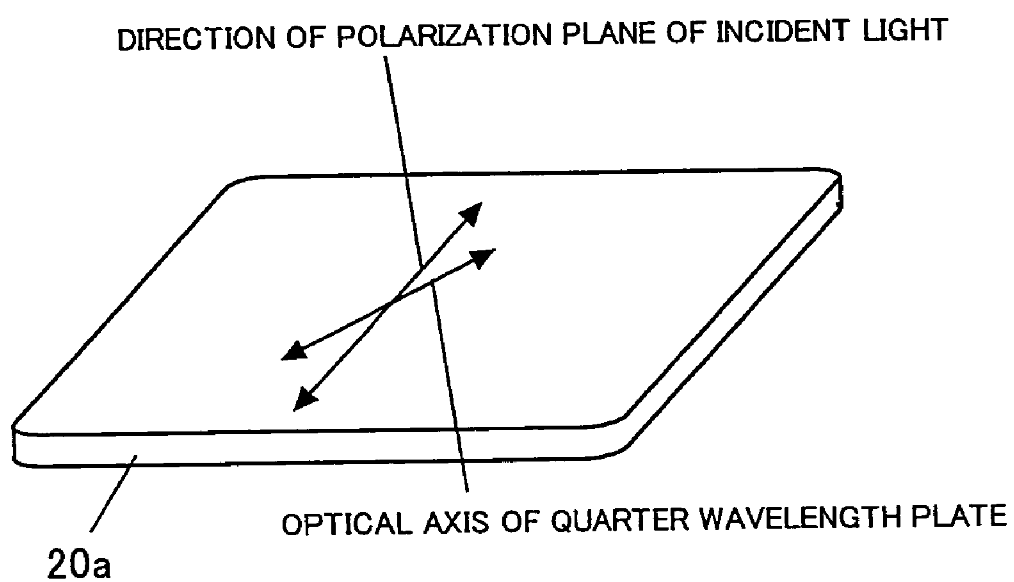
FIG. 3 is a perspective view showing a hologram recording medium card according to another embodiment of the present invention.

As shown in FIG. 3, a hologram recording medium can be a card-type hologram recording medium without rotation, for example, a rectangular parallel flat plate optical card 200*a*. In this event, for maintaining the direction of the polarization plane of incident light at an angle of 45 degrees to the optical axis of the quarter wavelength plate 6, a hologram recording medium can be implemented only by interposing the single ¼ wavelength plate 4 between the recording layer 7 and the reflective layer 4.

Figure 4:
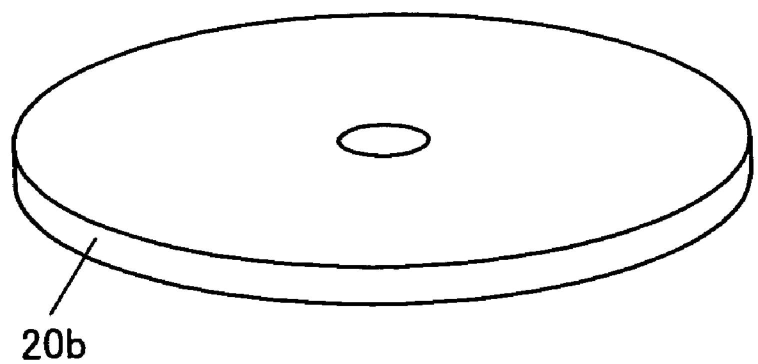
FIG. 4 is a hologram recording medium disc according to another embodiment of the present invention.

Further, FIG. 4 shows a hologram disc 20*b* which has a discoidal hologram recording medium.

Figure 5:
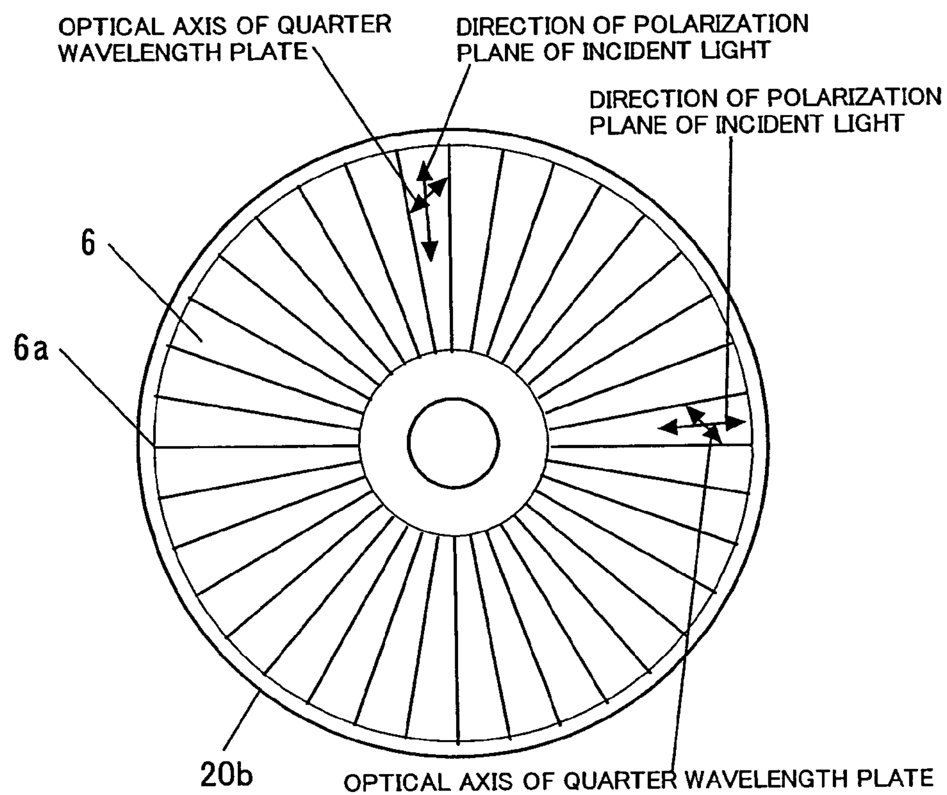
FIG. 5 is a plan view generally showing a hologram recording medium disc according to another embodiment of the present invention.

When the hologram recording medium is comprised of the hologram disc 20*b*, a single quarter wavelength plate adhered as it is to the disc inhibits the polarization plane of incident light from maintaining the angle of 45 degrees to the optical axis of the quarter wavelength plate due to the rotation of the disc. In other words, the quarter wavelength plate does not work as it should be at a certain rotating angle. Therefore, a plurality of quarter wavelength plates 6 (quarter wavelength plates 6, each of which has an optical axis that is maintained at an angle of 45 degrees to the radial direction made coincident with the direction of the polarization plane of incident light) may be adhered to form a disc, as shown in FIG. 5, to alleviate this problem. The division angle of the sector quarter wavelength plate 6 is set in such an angle range in which problems are hardly caused by variations in the reference light incident on an image sensor for reading signals due to the rotation of the disc. In other words, the optical axis of each quarter wavelength plate 6 is set within a predetermined angle range with respect to the direction of the polarization plane of the incident light. Also, by positioning an address area, a servo area, and the like on a division line 6*a* extending in the radial direction, it is possible to prevent the division line from adversely affecting the recording of data.

The principles of recording and reproducing will be described with reference to FIGS. 6 to 9 which show the hologram recording medium of this embodiment, given as an example, which is a hologram disc 2 that has a quarter wavelength plate 6 sandwiched between a recording layer 7 and a reflective layer 4.

Figure 6:
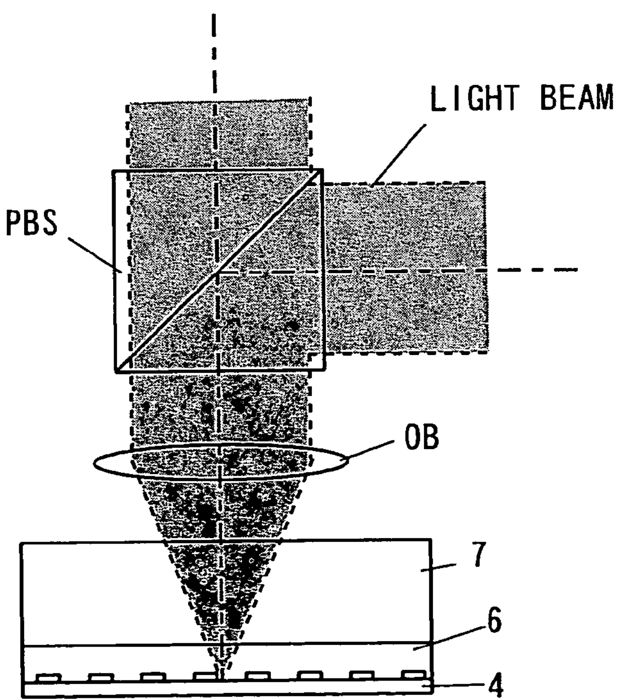
FIGS. 6 to 9 are schematic partial cross-sectional views for describing recording and reproduction of a hologram recording medium according to one embodiment of the present invention.

The optical axis of reference light and signal light (indicated by a one-dot chain line) shown in FIG. 6 is positioned in alignment to the optical axis of a polarization beam splitter PBS and an objective lens OB. The polarization beam splitter PBS is disposed such that its separation plane can separate P-polarized light and S-polarized light in directions perpendicular to each other. The signal light comprises a signal which includes digital data to be recorded into a dot pattern image arranged on a matrix plane to form page data or the like, and is modulated by a spatial light modulator or the like. The reference light is unmodulated light which has the same wavelength as the signal light. These two light beams are joined by a polarization beam splitter PBS into light beams (indicated by broken lines) having substantially the same optical axis. These light beams are converged by the objective lens OB, directed to the hologram disc 2, and focused on the reflective layer 4.

Figure 7:
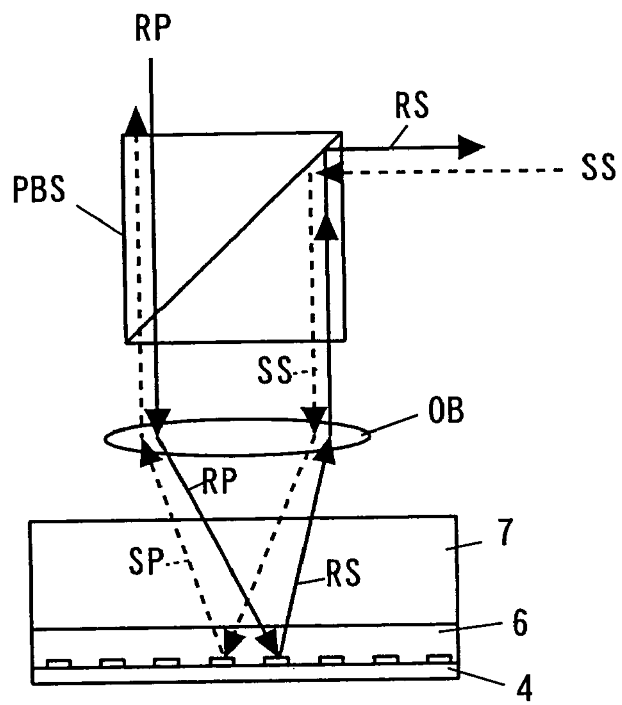

Referring to FIG. 7, a recording operation will be described, giving an example in which the reference light is P-polarized light, and the signal light is S-polarized light (the reference light is indicated by a solid-line arrow, while the signal light is indicated by a broken-line arrow, where they are shifted from the optical axis shown in FIG. 6, respectively, in order to explain an optical path). Of course, the relationship between the reference light and signal light with respect to the polarized light may be reversed, i.e., the reference light maybe S-polarized light, while the signal light may P-polarized light.

As shown in FIG. 7, the reference light RP of P-polarized light transmits the polarization beam splitter PBS, is converged by the objective lens OB, transmits the recording layer 7 of the hologram disc 2, and impinges on the quarter wavelength plate 6. The reference light is converted to circularly polarized light when it has transmitted the quarter wavelength plate 6, and is further reflected by the reflective layer 4, and again transmits the quarter wavelength plate 6. At this time, the reference light has been transformed into S-polarized reflected reference light RS oriented toward the polarization plane, different by 90 degrees from the polarization plane on which it has impinged, and is converted to collimated light by the objective lens OB. Therefore, the reference light reflected from the hologram disc 2 is separated from the original optical path of the reference light by the polarization beam splitter PBS.

The signal light SS of S-polarized light indicated by a broken-line arrow in FIG. 7 is reflected by the polarization beam splitter PBS and converged by the objective lens OB, transmits the recording layer 7 of the hologram disc 2, and impinges on the quarter wavelength plate 6. The signal light is transformed into circularly polarized light when it has transmitted the quarter wavelength plate 6. The signal light is further reflected by the reflective layer 4, and again transmits the quarter wavelength plate 6. At his time, the signal light has been transformed into P-polarized reflected signal light SP oriented toward the polarization plane, different by 90 degrees from the polarization plane on which it has impinged, is converted to collimated light by the objective lens OB, and transmits the polarization beam splitter PBS.

Since holograms can be recorded when the reference light and signal line have the polarization planes in the same direction, a set of the incident P-polarized reference light RP and P-polarized reflected signal light SP, and a set of the incident S-polarized signal light SS and S-polarized reflected reference light RS, i.e., a total of two sets interfere within the recording layer 7 of the hologram disc 2. There are two sets of holograms A (a hologram made by RP and SP) and B (a hologram made by RS and SS) recorded by these interferences.

Figure 8:
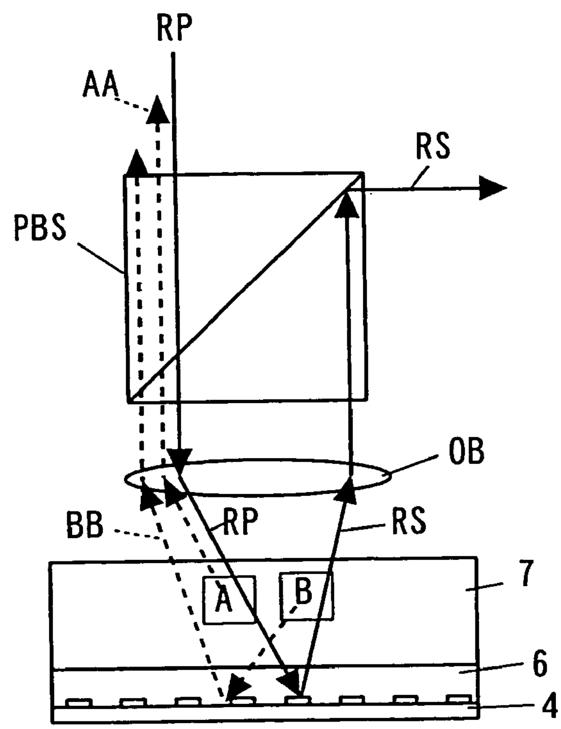

Referring to FIG. 8, a reproducing operation will be described, giving an example in which the reference light is P-polarized light (here, the reference light is indicated by a solid-line arrow, reproduction light is indicated by a broken-line arrow, the holograms A and B are represented by rectangles, and they are shifted from the optical axis shown in FIG. 6, respectively, in order to explain the optical path). Reproduction from the holograms A and B can be made irrespective of whether the reference light is P-polarized light or S-polarized light.

Figure 9:
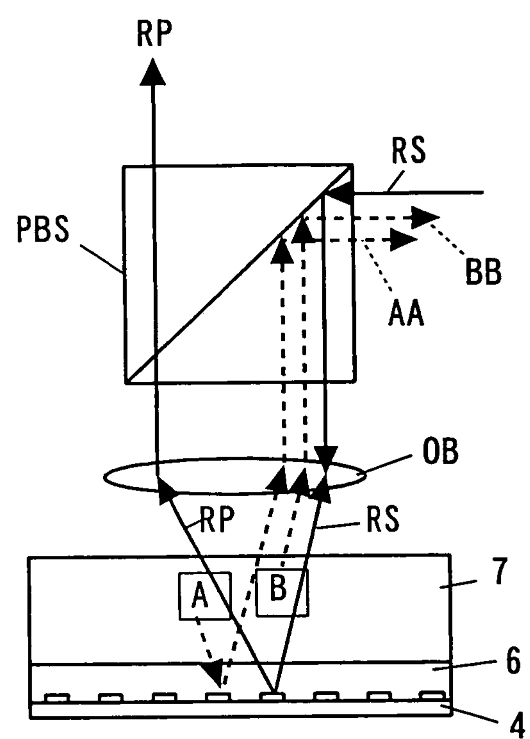

When the reference light is P-polarized light, the P-polarized reference light RP transmits the polarization beam splitter PBS, is converged by the objective lens OB, transmits the recording layer 7 of the hologram disc 2, and impinges on the quarter wavelength plate 6, as shown in FIG. 9. The reference light is converted to circularly polarized light when it has transmitted the quarter wavelength plate 6, is further reflected by the reflective layer 4, and again transmits the quarter wavelength plate 6. At this time, the reference light is transformed into S-polarized reflected reference light RS toward the polarization plane different by 90 degrees from the direction of the polarization plane on which it has impinged, and is converted to collimated light by the objective lens OB. Therefore, the reference light reflected from the hologram disc 2 is separated from the original optical path of the reference light by the polarization beam splitter PBS (similar to FIG. 7).

Here, reproduction light is produced from the holograms A and B, respectively. Reproduction light AA from the hologram A is produced toward the light source by the P-polarized reference light PR which impinges on the hologram disc 2. This is because the hologram A is made up of RP and SP. The signal light AA is P-polarized light.

Reproduction light BB from the hologram B is produced opposite to the direction of the light source, i.e., in the forward direction, by the reflected S-polarized reflected reference light S. This is because the hologram BB is made up of RS and SS. The signal light BB is S-polarized light. However, the signal light BB is transformed into P-polarized light when it exits the hologram disc 2 since it reciprocally transmits the quarter wavelength plate 6 through the reflective layer 4.

In other words, the signal light AA and BB are transformed into P-polarized light which is the same as the incident polarized light when exiting the hologram disc 2.

Since the reflected reference light can be separated from the signal light using the polarization beam splitter PBS in the foregoing manner, unnecessary reference light components will not enter the image sensor for receiving the reproduced signal. Also, since reproduced signals (reproduced images) from the two holograms A and B are the same, they may be detected by a single image sensor without any problem.

The reproducing operation can be performed in a similar manner when the reference light is S-polarized light.

The reproducing operation will be described, giving an example in which the reference light is S-polarized light with reference to FIG. 9 (here, the reference light is indicated by a solid-line arrow, reproduction light is indicated by a broken-line arrow, the holograms A and B are represented by rectangles, and they are shifted from the optical axis shown in FIG. 6, respectively, in order to explain the optical path).

When the reference light is S-polarized light, the optical path employed herein extends in the reverse direction to that associated with the P-polarized reference light. Specifically, as shown in FIG. 9, reference light RS of S-polarized light is reflected by the polarization beam splitter PBS and converged by the objective lens OB, transmits the recording layer 7 of the hologram disc 2, and impinges on the quarter wavelength plate 6. The reference light is converted to circularly polarized light when it has transmitted the quarter, wavelength plate 6, and is further reflected by the reflective layer 4, and again transmits the quarter wavelength plate 6. At this time, the reference light is transformed into P-polarized reflected reference light RS toward the polarization plane different by 90 degrees from the direction of the polarization plane on which it has impinged, and is converted to collimated light by the objective lens OB. Therefore, the reference light reflected from the hologram disc 2 passes through the polarization beam splitter PBS, and is separated from the original optical path of the reference light.

Here, reproduction light is produced from the holograms A and B, respectively. Reproduction light AA from the hologram A is reflected and produced toward the light source by the reflected P-polarized reflected reference light RP. This is because the hologram A is made up of RP and SP. Polarized light of the signal light AA is P-polarized light. However, this signal light AA is transformed into S-polarized light when it exits the hologram disc 2 as it reciprocally transmits the quarter wavelength plate 6 through the reflective layer 4.

Reproduction light BB from the hologram B is produced toward the direction of the light source by the S-polarized reference light S which impinges on the hologram disc 2. This is because the hologram BB is made up of RS and SS. The signal light BB is S-polarized light.

In other words, the signal light AA and BB is transformed into S-polarized light which is the same as the incident polarized light, when exiting the hologram disc 2.

<Hologram Recording and Reproducing Apparatus>

Figure 10:
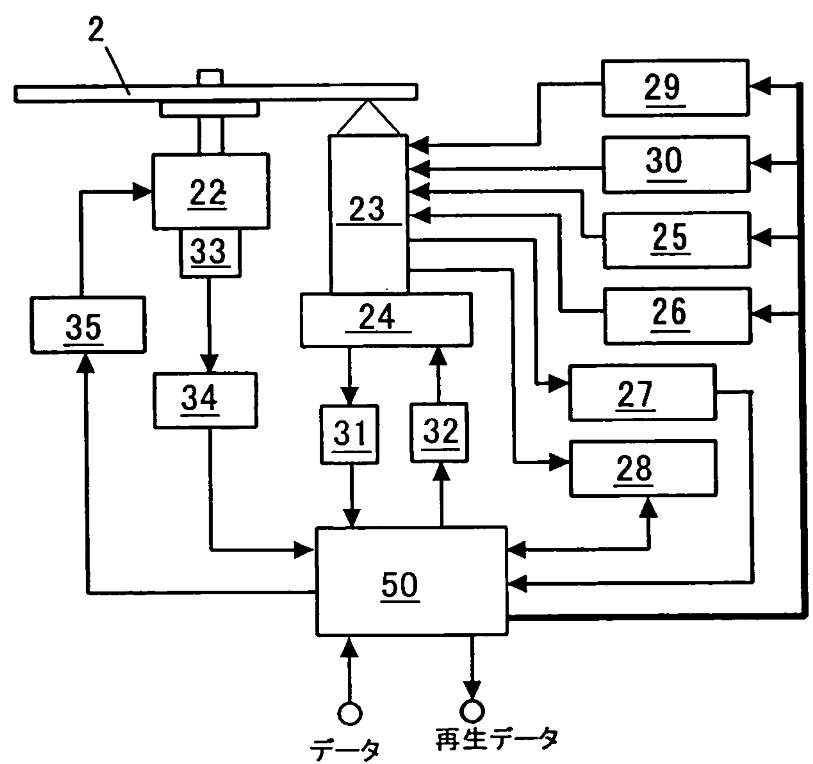
FIG. 10 is a block diagram generally illustrating the configuration of a recording and reproducing apparatus for recording or reproducing information on a hologram disc according to one embodiment of the present invention.
Figure 11:
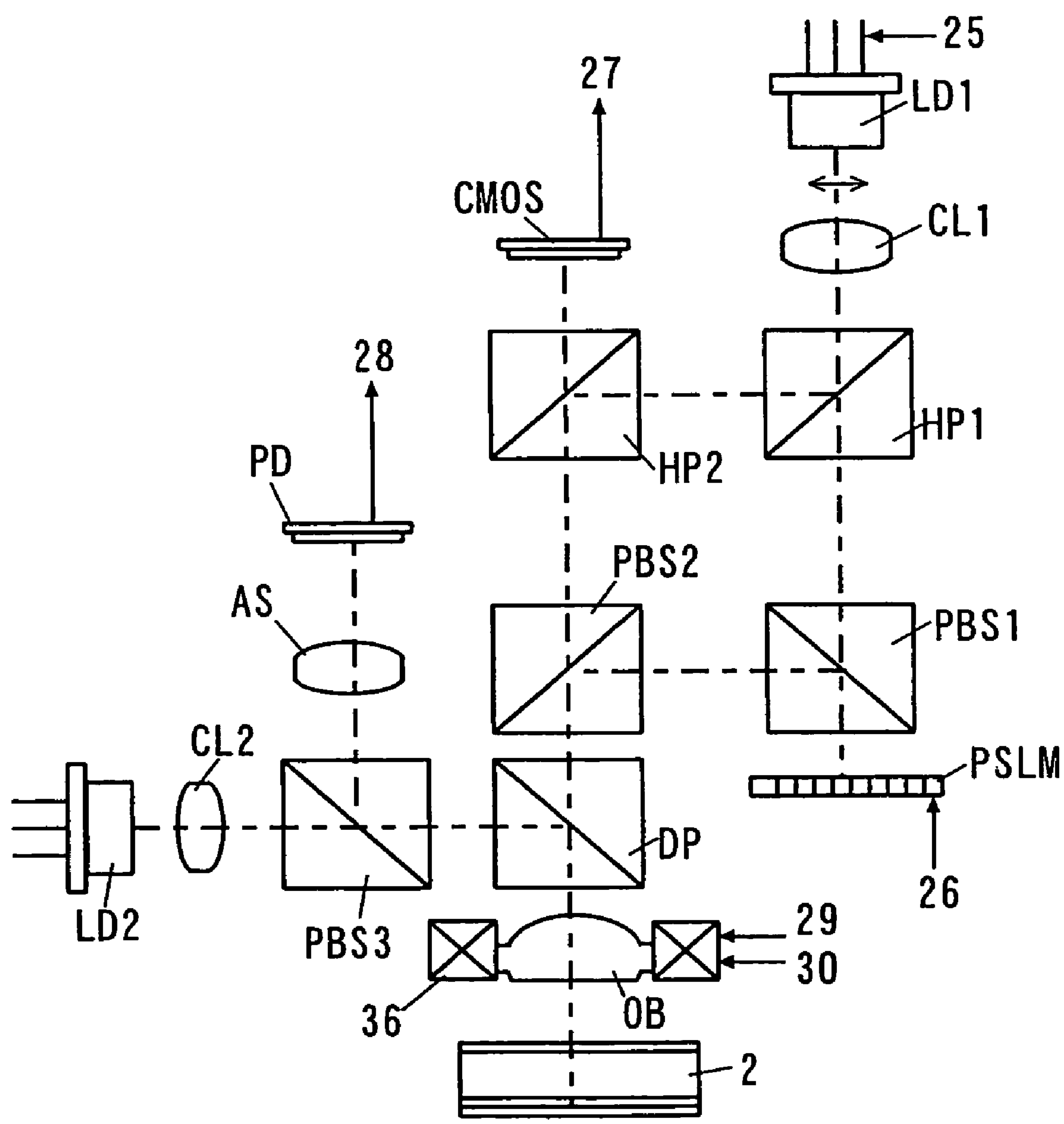
FIGS. 11 to 13 are schematic diagrams generally showing a pickup of a recording and reproducing apparatus for recording and reproducing information to and form a hologram disc according to one embodiment of the present invention.
Figure 12:
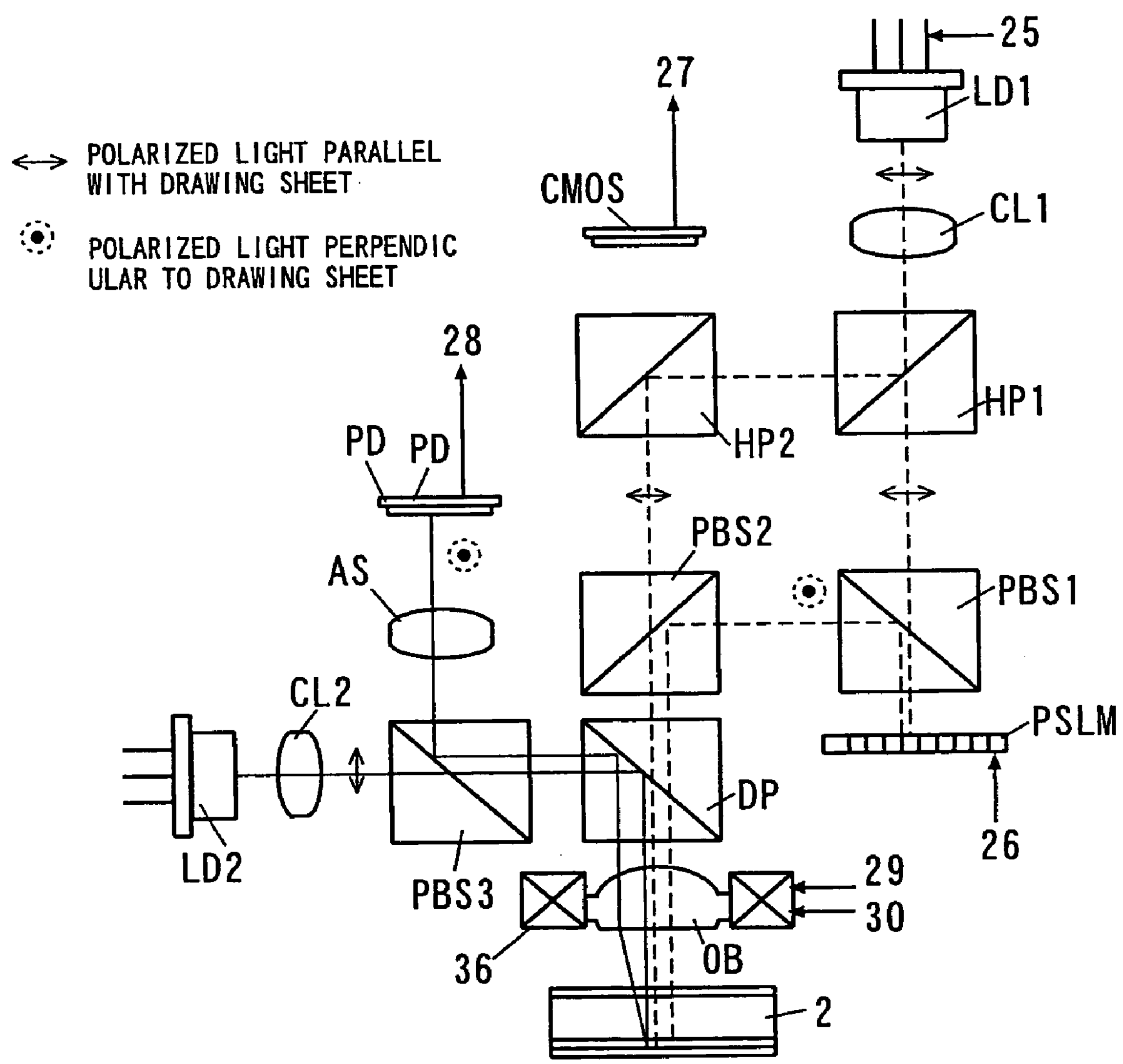
Figure 13:
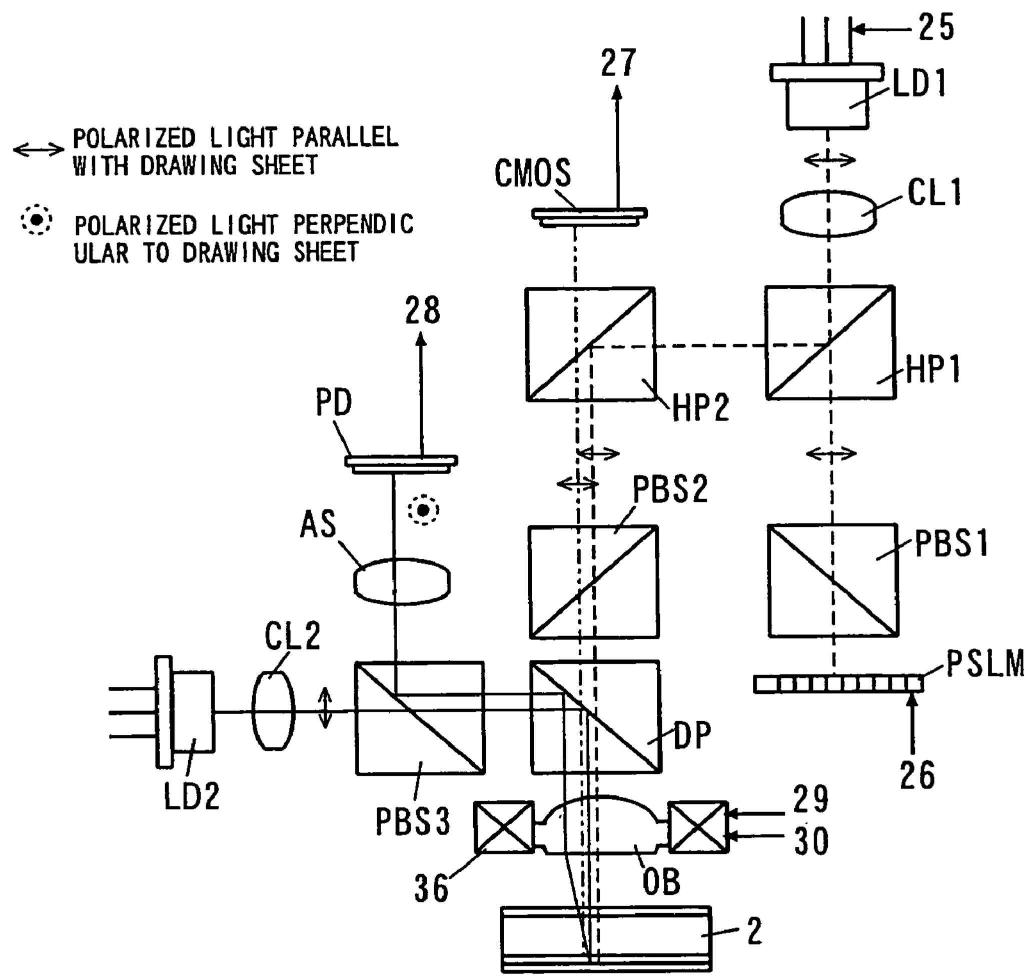

FIG. 10 shows the general configuration of a recording and reproducing apparatus for recording or reproducing information to or from a hologram disc to which the present invention is applied, and FIGS. 11–13 show the general configuration of a pickup of the recording and reproducing apparatus.

The hologram recording and reproducing apparatus of FIG. 10 comprises a spindle motor 22 for rotating the hologram disc 2 through a turn table; a pickup 23 for reading signals from the hologram disc 2 with light beams; a pickup actuator 24 for holding and radially moving the pickup 23; a first laser source driving circuit 25; a spatial light modulator driving circuit 26; a reproduced signal processing circuit 27; a servo signal processing circuit 28; a focus servo circuit 29; a tracking servo circuit 30; a pickup position detecting circuit 31 connected to the pickup actuator 24 for detecting a position signal of the pickup; a slider servo circuit 32 connected to the pickup actuator 24 for supplying a predetermined signal to the pickup actuator 24; an rotation encoder 33 connected to the spindle motor 22 for detecting a rotational speed signal of the spindle motor; a rotation detector 34 connected to the encoder for generating a rotating position signal of the hologram disc 2; and a spindle servo circuit 35 connected to the spindle motor 22 for supplying a predetermined signal thereto.

The hologram recording and reproducing apparatus has a controller circuit 50 connected to the first laser source driving circuit 25, spatial light modulator driving circuit 26, reproduced signal processing circuit 27, servo signal processing circuit 28, focus servo circuit 29, tracking servo circuit 30, pickup position detecting circuit 31, slider servo circuit 32, rotation encoder 33, rotation detector 34, and spindle servo circuit 35. The controller circuit 50 relies on signals from these circuits to conduct focus and tracking servo controls associated with the pickup, reproduced position (radial position) control, and the like through these drivers. The controller circuit 50, which is based on a microcomputer containing a variety of memories for generally controlling the apparatus, generates a variety of control signals in response to input operations by the user on an operation panel (not shown) and a current operating situation of the apparatus, and is connected to a display (not shown) for displaying an operating situation and the like to the user. The controller circuit 50 also processes data entered from the outside, which should be recorded, such as encoding of the data, and supplies predetermined signals to the spatial light modulator driving circuit 26 to control a recording operation. Furthermore, the controller circuit 50 restores data recorded on a hologram disc through demodulation and error correction processing, based on signals from the reproduced signal processing circuit 27. In addition, the controller circuit 50 decodes the restored data to reproduce information data which is output as reproduced information data.

The pickup 23 shown in FIG. 11 is made up of a recording and reproduction optical system which comprises a first laser source LD1 for recording and reproducing holograms, a first collimator lens CL1, a first half mirror HP1, a first polarization beam splitter PBS1, a polarization spatial light modulator PSLM, a reproduced signal detector including an image sensor CMOS comprised of a CCD, an array of complementary metal oxide film semiconductor devices or the like, a second half mirror HP2, and a second polarization beam splitter PBS2; a servo system which comprises a second laser source LD2 for servo-controlling (focus, tracking) the position of the light beam with respect to the hologram disc 2, a second collimator lens CL2, a third polarization beam splitter PBS3, an astigmatism element AS such as a cylindrical lens, and a servo signal detector including a photodetector PD; and a common system which comprises a dichroic prism DP and an objective lens OB. These systems are placed substantially on the common plane except for the objective lens OB. Half mirror surfaces of the first and second half mirrors HP1, HP2, and a separation plane of the second polarization beam splitter PBS2 are disposed to be parallel with one another, and in a normal direction of these half mirror planes and separation plane, separation planes of the first polarization beam splitter PBS1, dichroic prism DP and third polarization beam splitter PBS3 are in parallel with one another. These optical parts are disposed such that the optical axes (one-dot chain lines) of light beams from the first and second laser sources LD1 and LD2 extend to the recording and reproducing optical system and servo system, respectively, and substantially match in the common system.

Further, the pickup 23 comprises an objective lens actuator 36 which is made up of a focusing section for moving the objective lens in the optical axis direction, and a tracking section for moving the objective lens in a radial direction of the disc perpendicular to the optical axis.

The first laser source LD1 is connected to the first laser source driving circuit 25, and has its output adjusted by the first laser source driving circuit 25 such that the intensity of an emitted light beam is increased for recording and decreased for reproduction.

The polarization spatial light modulator PSLM has a function of electrically changing the direction of part of the polarization plane of incident light and reflecting the resulting incident light with a liquid crystal panel having a plurality of pixel electrodes divided into a matrix form, and a function of transmitting all incident light so that any incident light is reflected. The polarization spatial light modulator PSLM, which is connected to the first laser source driving circuit 25, modulates and reflects an light beam so as to have a polarization component distribution based on page data to be recorded (two-dimensional data such as bright and dark dot pattern or the like on a plane) from the spatial light modulator driving circuit 26 to generate signal light.

The reproduced signal detector including the image sensor CMOS is connected to the reproduced signal processing circuit 27.

The photodetector PD is connected to the servo signal processing circuit 28, and has the shape of light receiving element divided for focus and tracking servo generally used for optical discs. The servo scheme is not limited to an astigmatism method, but can employ a push-pull method. The output signal of the photodetector PD, such as a focus error signal and a tracking error signal is supplied to the servo signal processing circuit 28.

In the servo signal processing circuit 28, a focusing driving signal is generated from the focus error signal, and is supplied to the focus servo circuit 29 through the controller circuit 50. The focus servo circuit 29 drives the focusing section of the objective lens actuator 36 mounted in the pickup 23, so that the focusing section operates to adjust the focus position of an optical spot irradiated to the hologram disc.

Further, in the servo signal processing circuit 28, a tracking driving signal is generated from a tracking error signal, and supplied to the tracking servo circuit 30. The tracking servo circuit 30 drives the tracking section of the objective lens actuator 36 mounted in the pickup 23 in response to the tracking driving signal, and the tracking section displaces the position of the optical spot irradiated to the hologram disc in the radial direction of the disc by an amount corresponding to the driving current carried by the tracking driving signal.

The controller circuit 50 generates a slider driving signal based on a position signal from the operation panel or the pickup position detecting circuit 31 and the tracking error signal from the servo signal processing circuit 28, and supplies the slider driving signal to the slider servo circuit 32. The slider servo circuit 32 moves the pickup 23 in the radial direction of the disc in response to a driving current carried with the slider driving signal by the pickup actuator 24.

The rotation encoder 33 detects a frequency signal indicative of a current rotating frequency of the spindle motor 33 for rotating the hologram disc 2 through the turn table, generates a rotational speed signal indicative of the spindle rotational signal corresponding thereto, and supplies the rotational speed signal to the rotation detector 34. The rotation detector 34 generates a rotational speed position signal which is supplied to the controller circuit 50. The controller circuit 50 generates a spindle driving signal which is supplied to the spindle servo circuit 35 to control the spindle motor 22 for driving the hologram disc 2 to rotate.

<Method of Recording and Reproducing Hologram>

Description will be made on a recording and reproducing method for recording or reproducing information by irradiating a hologram disc with an light beam using the hologram recording and reproducing apparatus described above.

During recording, as shown in FIG. 12, coherent light having a predetermined intensity from the first laser source LD1, which is P-polarized light (double-head arrow indicating the parallelism to the drawing sheet), is separated into a reference beam and a signal beam by the first half mirror HP1 (both the beams are indicated by broken lines and are shifted from the optical axis for explaining the optical path).

The signal beam transmits the first polarization beam splitter PBS1, and impinges on the polarization spatial light modulator PSLM along the normal of the reflective surface. The signal light modulated in a predetermined manner by and reflected from the polarization spatial light modulator PSLM again impinges on the first polarization beam splitter PBS1, but only a polarized light component, which has been modulated, is reflected at the first polarization beam splitter PBS1, while a non-modulated component transmits the first polarization beam splitter PBS1. The modulated component (signal light) is transformed into S-polarized light (a black circle surrounded by a broken-line circle indicative of being perpendicular to the drawing sheet) and directs to the second polarization beam splitter PBS2.

The reference beam, remaining to be P-polarized light, is reflected by the second half mirror HP2, and directs to the second polarization beam splitter PBS2.

Since the reference light differs from the signal light in the direction of polarization plane, they are combined using the second polarization beam splitter PBS2. The two combined light beams pass through the dichroic prism DP, and are converged on the hologram disc 2 by the objective lens OB for recording a hologram.

During reproduction, on the other hand, light is separated into a reference beam and a signal beam by the first half mirror HP1, in a manner similar to the recording, as shown in FIG. 13, however, holograms are reproduced only with the reference beam. By bringing the polarization spatial light modulator PSLM into a non-reflective state, only reference light (P-polarized light) from the second half mirror HP passes through the dichroic prism DP and objective lens OB, and impinges on the hologram disc 2.

Since reproduced light (two-dot chain line) generated from the hologram disc 2 is P-polarized light, the reproduced light transmits the objective lens OB, dichroic prism DP, second polarization beam splitter PBS2, and second half mirror HP2, and impinges on the image sensor CMOS. The image sensor CMOS delivers an output corresponding to an image formed by the reproduced light to the reproduced signal processing circuit 27 which generates a reproduced signal that is supplied to the controller circuit 50 for reproducing recorded page data. An image forming lens may be provided between the half mirror HP2 and the image sensor CMOS.

During both recording and reproduction, the second laser source DL2 for servo control emits coherent light at a different wavelength from the first laser source LD1, as shown in FIGS. 12 and 13. The servo light beam (thin solid line) from the second laser source DL2 is P-polarized light which is led along an optical path for servo detection including the second collimator lens CL2 and third polarization beam splitter PBS3, but is combined with the signal beam and reference beam by the dichroic prism DP immediately before the objective lens OB. The servo light beam, after reflected by the dichroic prism DP, is converged by the objective lens OB, and impinges on the hologram disc 2. Return light of the servo light beam reflected from the hologram disc 2 back to the objective lens OB is transformed into S-polarized light which impinges on a light receiving surface of the servo photodetector PD along the normal thereof through the third polarization beam splitter PBS3 and astigmatism element AS.

Figure 14:
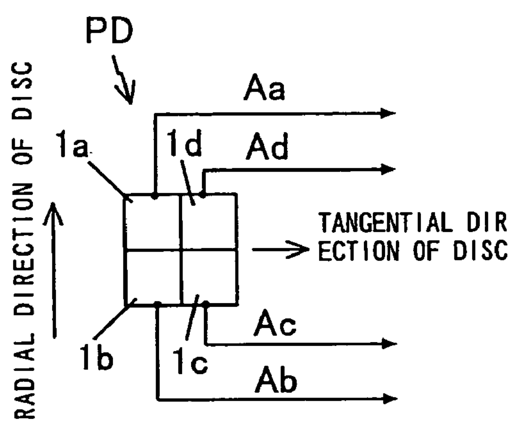
FIG. 14 is a plan view showing a photodetector in the pickup of the recording and reproducing apparatus for recording and reproducing information to and from a hologram disc according to one embodiment of the present invention.

Here, for recording and reproducing holograms, a servo control is conducted for positioning with the hologram disc 2 using the servo light beam. With the astigmatism method, the photodetector PC comprises light receiving elements 1*a*–*d* having a light receiving surface equally divided into four for receiving a beam, for example, as shown in FIG. 14. The directions in which the photodetector PD is divided correspond to the radial direction of the disc and a tangential direction of the guide tracks. The photodetector PD is set such that a focused light spot appears to be a circle centered at the intersection of lines which divide the photodetector PD into the light receiving elements 1*a*–*d*.

In accordance with output signals of the respective light receiving elements 1*a*–*d* of the photodetector PD, the servo signal processing circuit 28 generates an RF signal Rf and a focus error signal. When the signals of the light receiving elements 1*a*–1*d* are labeled Aa–As, respectively, in this order, the RF signal Rf is calculated by Rf=Aa+Ab+Ac+Ad, the focus error signal FE is calculated by EF=(Aa+Ac)–(Ab+Ad), and the tracking error signal THE is calculated by THE=(Aa+Ad)–(Ab+Ac). These error signals are supplied to the controller circuit 50.

In the embodiment described above, while the focus servo and tracking servo are based on the astigmatism method, a known method such as a three-beam method may be employed without limiting to the astigmatism method.

<Pickup in Other Embodiments>

For performing the tracking servo, the light beam spot SL of either the reference light or signal light is converged to a diffraction limit determined by the wavelength of the light beam and the numerical aperture of the objective lens. In another embodiment, instead of identically converged reference light and signal light, they may be converged in different states by converging the light beams of the reference light and signal light on layers at different positions in the depth direction.

Figure 15:
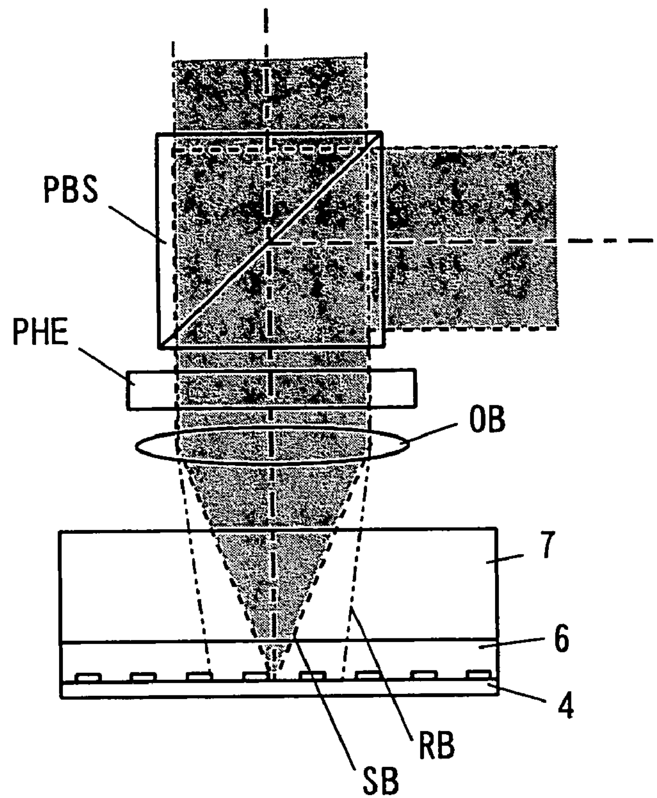
FIGS. 15 and 16 are schematic partial cross-sectional views for describing recording and reproduction of a hologram recording medium according to another embodiment of the present invention.

FIG. 15 shows an embodiment which is identical in configuration to FIG. 6 except that a polarization hologram element PHE is coaxially disposed between the polarization beam splitter PBS and objective lens OB, and the reference beam RB is defocused, i.e., focused at a position deeper than the reflective layer 4 so that the signal beam SB alone is focused on the reflective layer 4. Conversely, the signal light may be defocused, while the reference light may be focused on the reflective layer.

Figure 16:
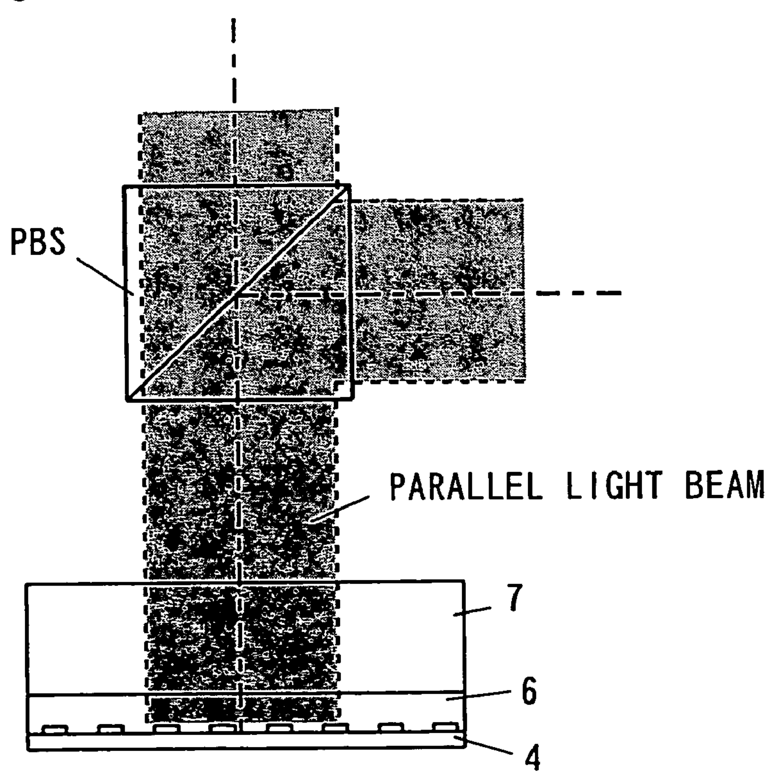

In a further embodiment, when neither the reference light nor the signal light is used for the tracking servo, both the reference light and signal light may impinge on a hologram recording medium in the form of parallel light. FIG. 16 shows an embodiment identical in configuration to FIG. 6 except that no objective lens OB is interposed between the polarization beam splitter PBS and the hologram disc 2, so that the reference light and signal beam are both directed into the reflective layer 4 in the form of parallel light.

In the exemplary configuration of the pickup shown in FIG. 11, a light beam from the first laser source LD1 for recording and reproducing holograms is directed into the polarization spatial light modulator PSLM through the first collimator lens CL1, first half mirror HP1, and first polarization beam splitter PBS1. However, instead of the reflection type polarization spatial light modulator PSLM, a transmission type spatial light modulator may be used.

Figure 17:
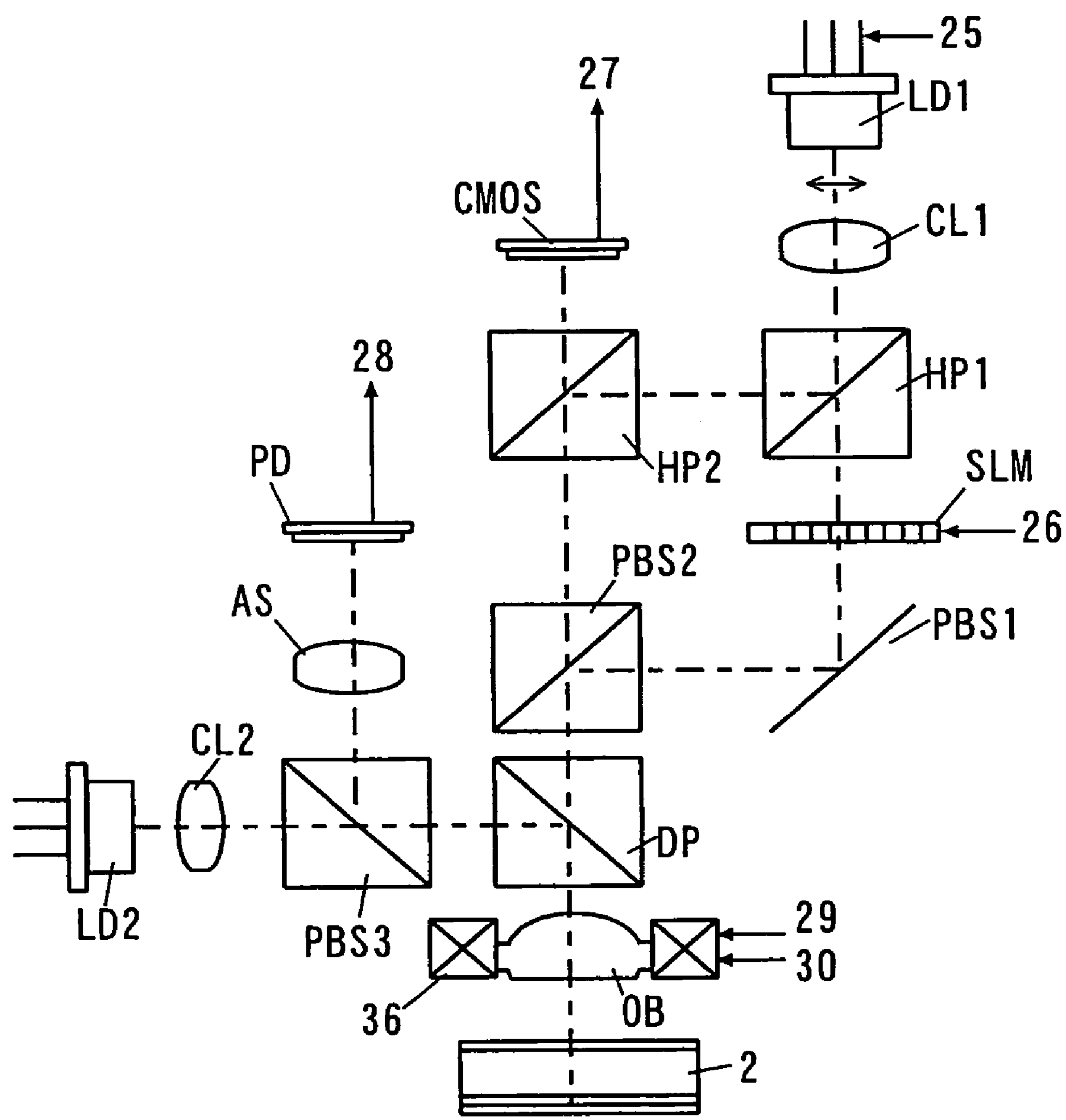
FIGS. 17 to 20 are schematic diagrams generally showing pickups for use in a recording and reproducing apparatus for recording and reproducing information to and from a hologram disc according to other embodiments of the present invention.

FIG. 17 shows an embodiment identical in configuration to FIG. 11 except that the first polarization beam splitter PBS1 and polarization spatial light modulator PSLM are replaced with a mirror M disposed at the position of the first polarization beam splitter in parallel with the split plane of the second polarization beam splitter PBS2 for matching the reference optical path with the signal optical path, and with a transmission type spatial light modulator SLM disposed on an optical path between the first half mirror HP1 and the mirror M. The transmission type spatial light modulator SLM has a function of electrically transmitting or blocking part or all of incident light with a transmission type liquid crystal panel or the like having a plurality of pixel electrodes divided in a matrix shape, and generates a signal beam having an intensity distribution based on page data to be recorded.

The exemplary configuration of the pickup shown in FIGS. 18–20 has been described in connection with the reference light which is P-polarized light during reproduction. When the reference light is S-polarized light, the pickup may be configured as shown in FIGS. 15 and 16.

Figure 18:
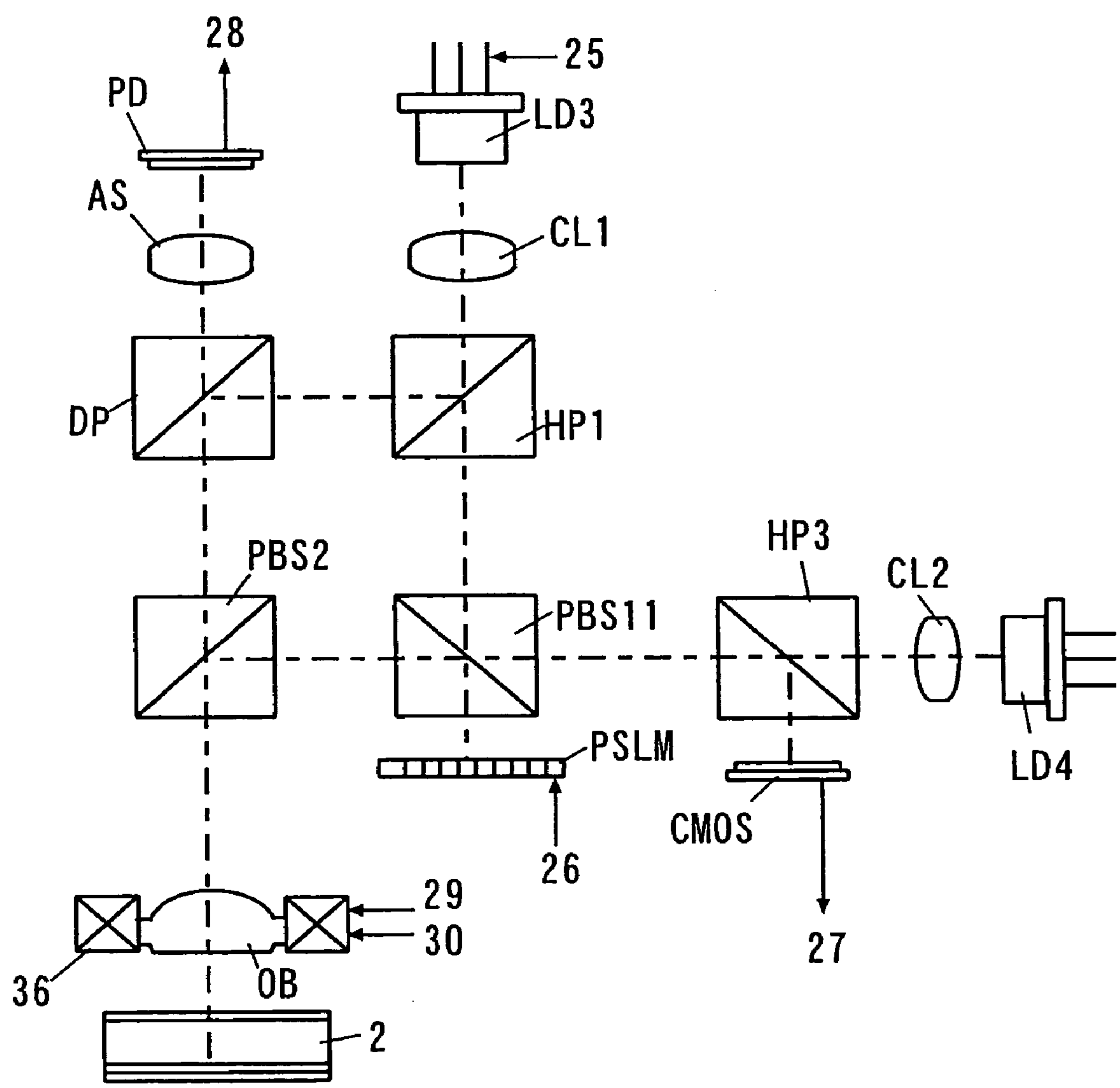

The pickup in another embodiment shown in FIG. 18 (which is used for the pickup 23 in the apparatus of FIG. 10) employs a third laser source LD3 for recording holograms, and a fourth laser source LD4 at a different wavelength from the third laser source LD3 for servo-control (focus, tracking) of the positional relationship between the hologram disc 2 and light beams and for reproduction of holograms. During reproduction, a light beam from the fourth laser source LD4 is used to control the positioning with the hologram disc 2 and to simultaneously reproduce holograms as well. If the material of the recording layer in the hologram disc 2 does not have light resistance to a recording wavelength, recorded data could be corrupted if the data is read at the same wavelength as the recording wavelength. This embodiment can advantageously avoid such corruption. The recording optical system comprises the third laser source LD3 at a wavelength for recording holograms, first collimator lens CL1, first half mirror HP1, first dichroic polarization beam splitter PBS11, polarization spatial light modulator PSLM, a dichroic prism DP, and second polarization beam splitter PBS2. The reproduction optical system and the servo system of the servo signal detector include the fourth laser source LD4 at a wavelength different from the third laser source LD3, second collimator lens CL2, third half mirror HP3, reproduced signal detector including the image sensor CMOS comprised of CCD, an array of complementary metal oxide film semiconductor devices or the like, first dichroic polarization beam splitter PBS11, second polarization beam splitter PBS2, dichroic prism DP, astigmatism element AS such as a cylindrical lens, and photodetector PD. The objective lens OB is a common optical system. These systems are placed substantially on the common plane except for the objective lens OB.

The half mirror surface of the first half mirror HP1, and the separation planes of the second polarization beam splitter PBS2 and dichroic prism DP are disposed to be in parallel with one another, and the separation planes of the first dichroic polarization beam splitter PBS11 and third half mirror HP3 are disposed to be in parallel with one another in the normal direction of these half mirror surface and separation planes. These optical parts are disposed such that the optical axes (one-dot chain lines) of light beams from the third and fourth laser sources LD3, LD4 extend to the recording and reproducing optical system and servo system, respectively, and substantially match in the common system.

Further, the pickup comprises an objective lens actuator 36 which is made up of a focusing section for moving the objective lens in the optical axis direction, and a tracking section for moving the objective lens in a radial direction of the disc perpendicular to the optical axis.

The third laser source LD3 is connected to the first laser source driving circuit 25, and has its output adjusted by the first laser source driving circuit 25 such that the intensity of an emitted light beam is increased for recording and decreased for reproduction. The polarization spatial light modulator PSLM is connected to the first laser source driving circuit 25, and modulates and reflects the light beam to generate signal light to have a polarization component distribution based on page data to be recorded from the spatial light modulator driving circuit 26.

Figure 19:
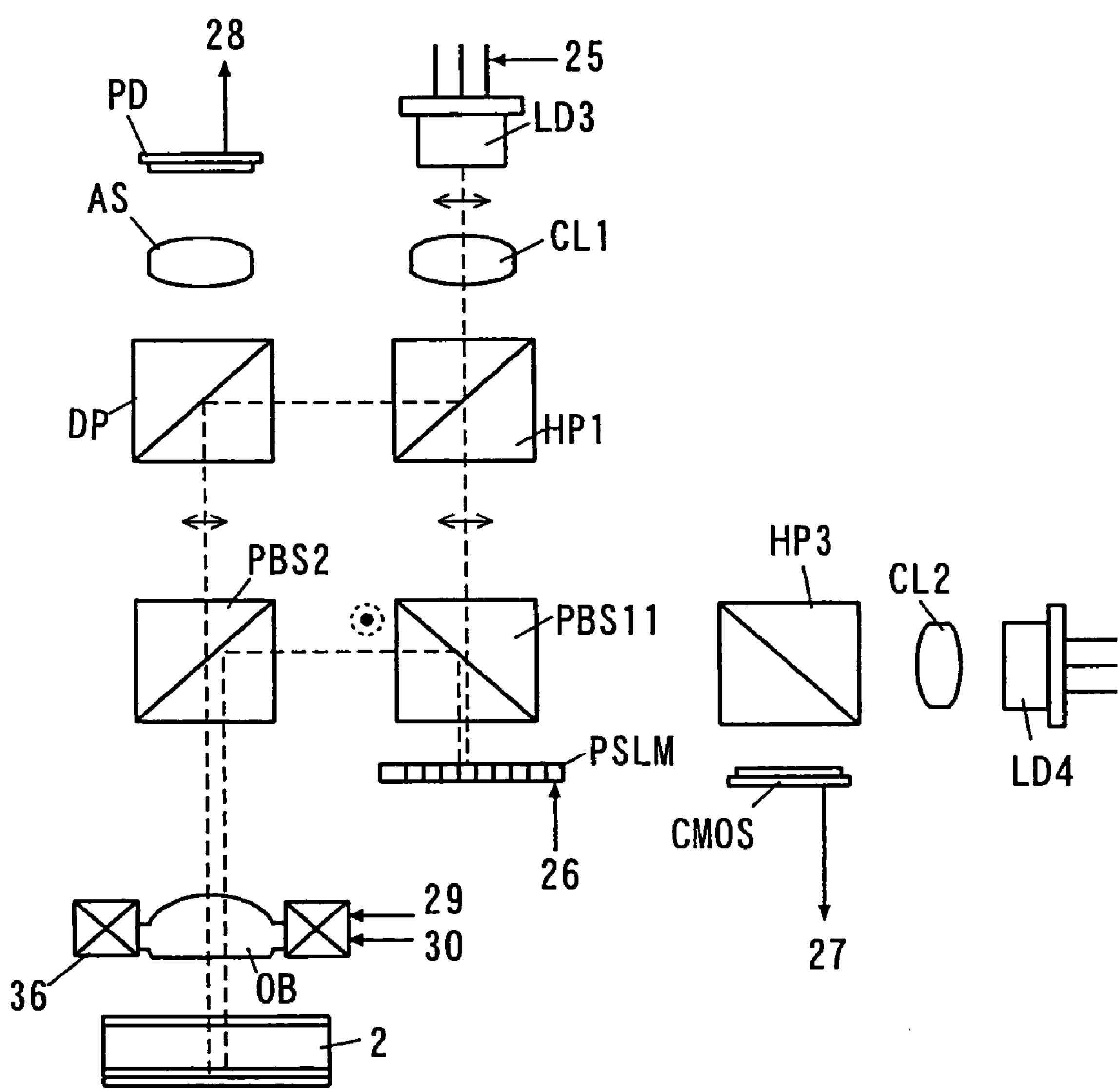

During recording, as shown in FIG. 19, coherent light having a predetermined intensity from the third laser source LD3, which is P-polarized light (double-head arrow indicating the parallelism to the drawing sheet), is separated into a reference beam and a signal beam by the first half mirror HP1 (both the beams are indicated by broken lines and are shifted from the optical axis for explaining the optical path).

The signal beam transmits the first dichroic polarization beam splitter PBS11, and impinges on the polarization spatial light modulator PSLM along the normal of the reflective surface. This first dichroic polarization beam splitter PBS11 serves as a polarization beam splitter for the light at the wavelength from the third laser source LD3 for recording, and transmits the light at the wavelength from the fourth laser source LD4 for reproduction and serve control. The signal light modulated in a predetermined manner by and reflected from the polarization spatial light modulator PSLM again impinges on the first polarization beam splitter PBS1, but only a polarized light component, which has been modulated, is reflected at the first dichroic polarization beam splitter PBS11, while a non-modulated component transmits the first dichroic polarization beam splitter PBS11. The modulated component (signal light) is transformed into S-polarized light (a black circle surrounded by a broken-line circle indicative of being perpendicular to the drawing sheet) and directs to the second polarization beam splitter PBS2. While the polarization spatial light modulator PSLM has been described, giving a reflection type one as an example, a transmission type spatial light modulator SLM may be used in the configuration shown in FIG. 17.

The reference beam, remaining to be P-polarized light, is reflected by the dichroic prism DP, and directs to the second polarization beam splitter PBS2.

Since the reference light differs from the signal light in the direction of polarization plane, they are combined using the second polarization beam splitter PBS2. The two combined light beams are converged on the hologram disc 2 by the objective lens OB for recording a hologram.

Figure 20:
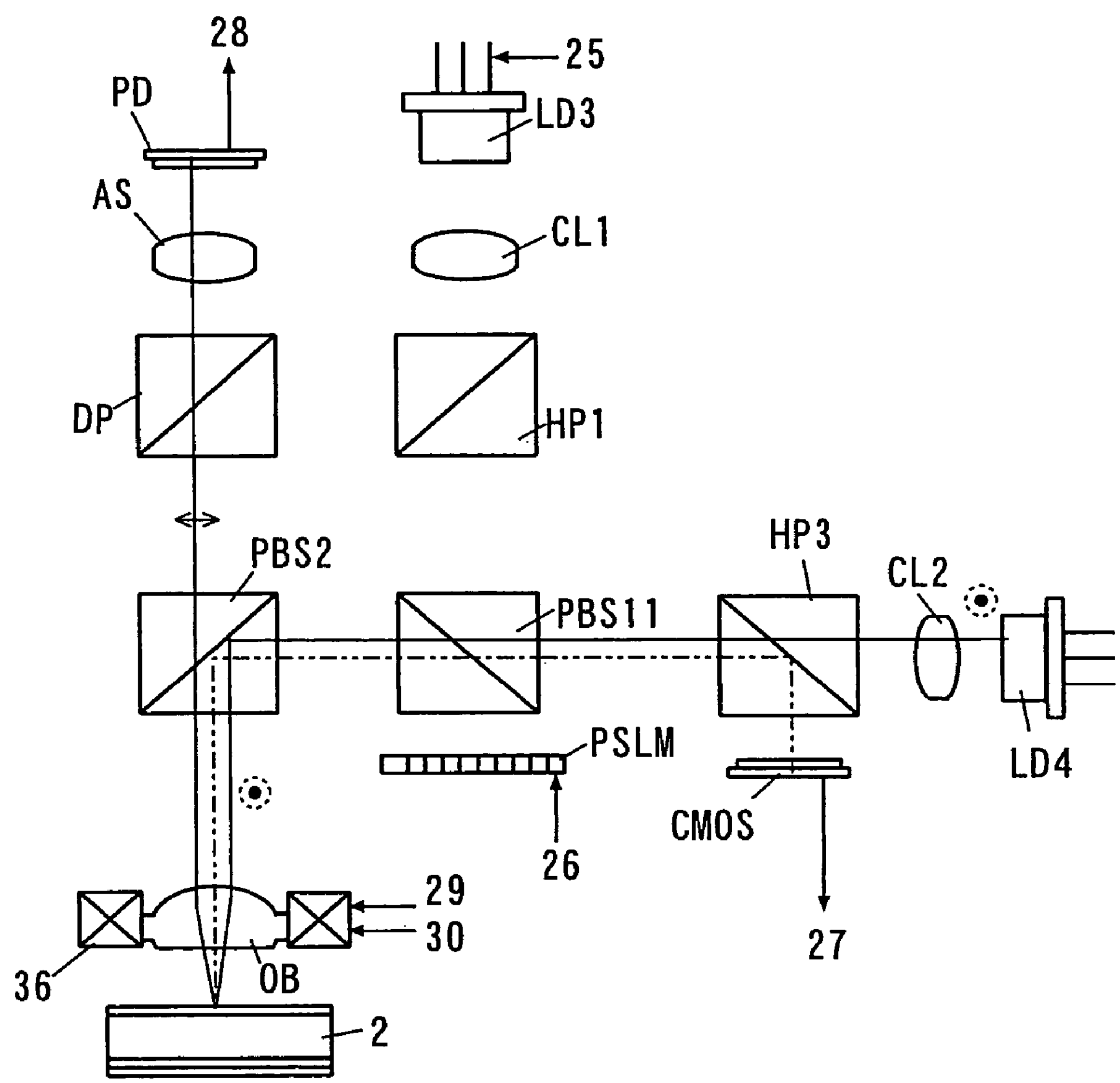

On the other hand, during reproduction, as shown in FIG. 20, a light beam from the fourth laser source LD4 is S-polarized beam which passes through the third half mirror HP3 and first dichroic polarization beam splitter PBS11, is reflected by the second polarization beam splitter PBS2 and converged by the objective lens OB, and impinges on the hologram disc 2 as being S-polarized light.

Since reproduced light (two-dot chain line) generated from the hologram disc 2 is P-polarized light, a component which transmits the objective lens OB, is reflected by the second polarization beam splitter PBS2, transmits the first dichroic polarization beam splitter PBS11, and is reflected by the third half mirror HP3 impinges on the image sensor CMOS. The image sensor CMOS delivers an output corresponding to an image formed by the reproduced light to the reproduced signal processing circuit 27 which generates a reproduced signal that is supplied to the controller circuit 50 for reproducing recorded page data.

The light beam for the servo and reproduction is additionally used as reference light (thin solid line) for reading holograms. The light reflected from the hologram disc 2 is transformed into P-polarized light which impinges on a light receiving surface of the servo photodetector PD along the normal thereof through the objective lens OB, second polarization beam splitter PBS2, dichroic prism DP, and astigmatism element AS.

The photodetector PD is connected to the servo signal processing circuit 28, and has the shape of light receiving element divided for focus and tracking servo generally used for optical discs. The servo scheme is not limited to an astigmatism method, but can employ a push-pull method. The output signal of the photodetector PD, such as a focus error signal and a tracking error signal, is supplied to the servo signal processing circuit 28. The objective lens OB is driven by the objective lens actuator 36 dominated by the servo signal processing circuit 28. The positional relationship between the hologram disc 2 and the objective lens OB can be controlled by these to stably record and reproduce holograms.

<Recording Media in Other Embodiments>

Figure 21:
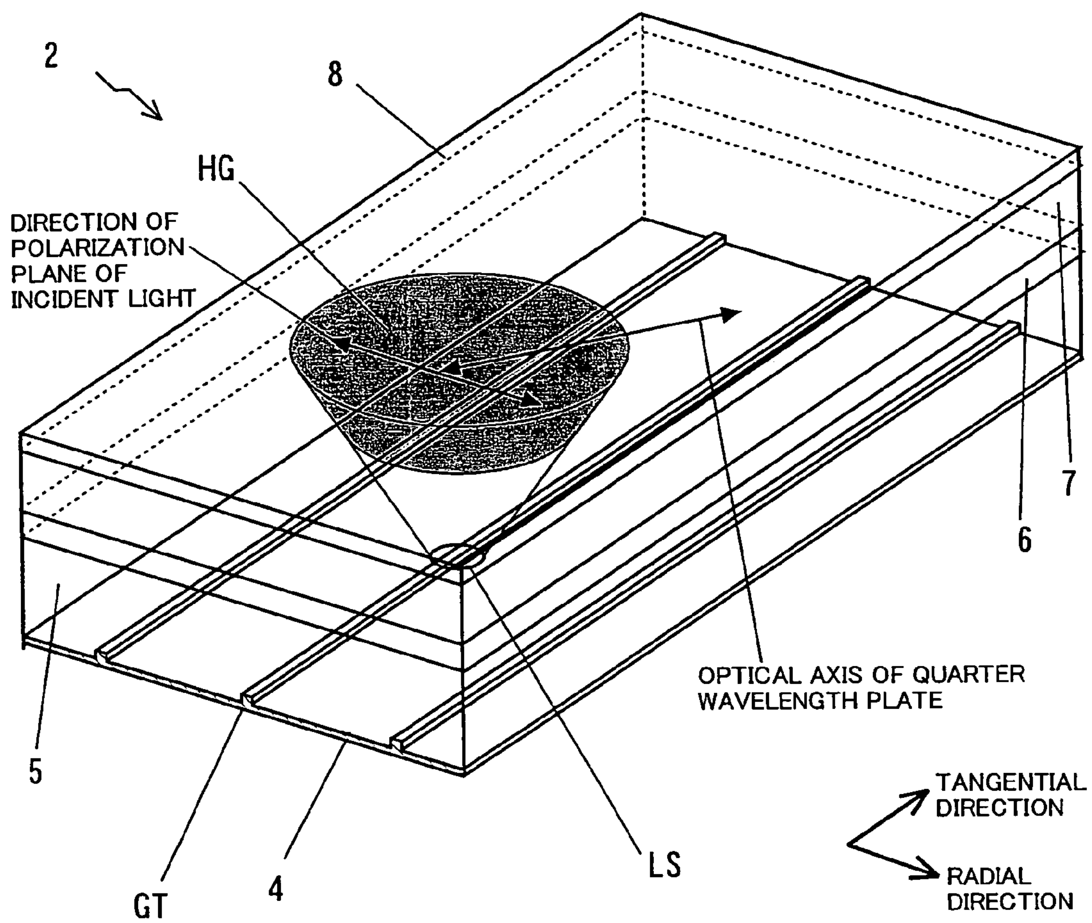
FIGS. 21 and 22 are partial cross-sectional views generally showing a hologram recording medium according to another embodiment of the present invention.

As shown in FIG. 21, the hologram recording medium may be such that the transparent substrate is functioned as the separation layer 5, the quarter wavelength plate 7, recording layer 7, and protective layer 8 are laminated in order on the opposite side from the substrate surface on which the reflective layer 4 is laminated, and the quarter wavelength plate 6 is interposed between the recording layer 7 and the reflective layer 4. With the hologram disc 20*b* shown in FIG. 4, a guide track GT is formed on the substrate spirally or concentrically with respect to the center of the substrate, or formed into a plurality of separated spiral arcs. With the hologram optical card 20*a* of a card-type hologram recording medium, which does not involve rotation, shown in FIG. 2, guide tracks GT are formed in parallel with one another on the reflective surface of the substrate. During recording and reproduction, a tracking servo is conducted to make a light beam spot LS follow the guide tracks GT on the reflective layer 4.

Figure 22:
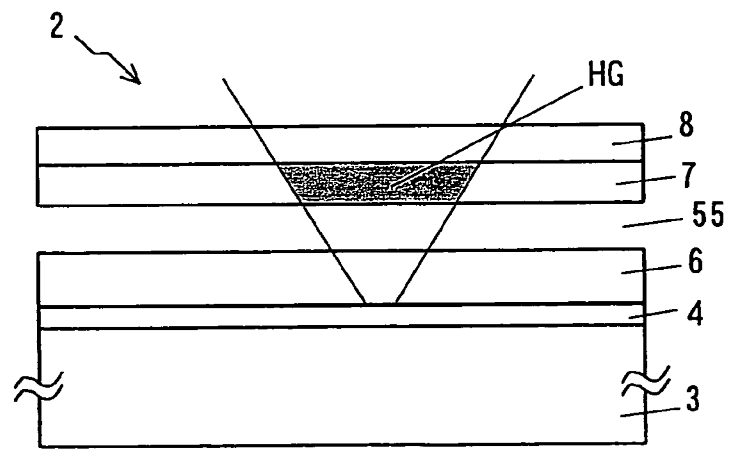
Figure 23:
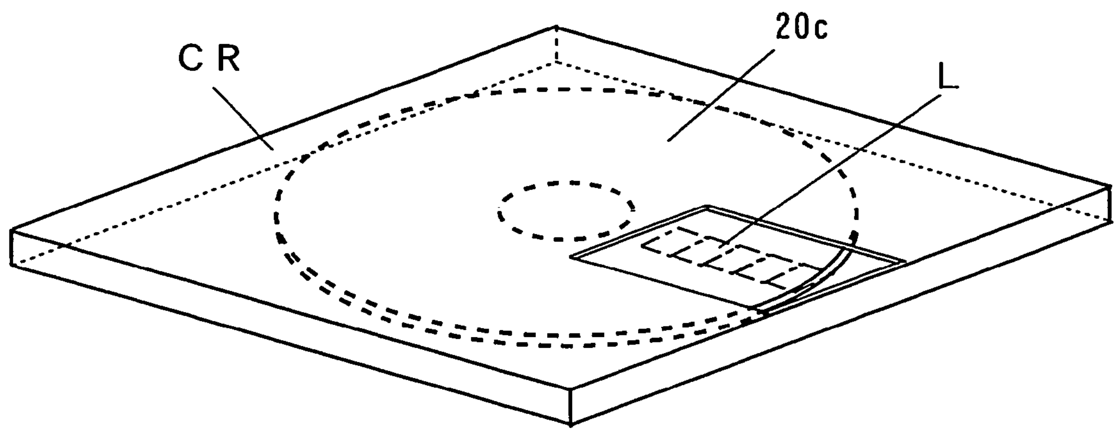
FIG. 23 is a perspective view showing a hologram recording medium according to another embodiment of the present invention.

Further, in another embodiment, as shown in FIG. 22, the recording layer 7 made of a photo-sensitive material is carried on the protective layer 8, the quarter wavelength plate 6 is disposed to oppose the recording layer 7 across a space 55, the quarter wavelength plate 6 and recording layer 7 are separated such that a light beam transmitting the recording layer impinges on the quarter wavelength plate 6 and reflective layer 4 through the space 55, and these components can be integrated such that the hologram recording medium of the recording layer 7 can be replaceably inserted. Also, while the hologram recording medium can be made in a variety of shapes such as a disc, a card, and the like, a discoidal hologram recording medium 20*c* including the recording layer 7 can be housed in a cartridge CR which can be provided with a laminate L of the quarter wavelength plate 6 and reflective layer 4 on the inner wall surface thereof from the light incident side, as shown in FIG. 23.

In either of the embodiments, when a signal is reproduced from recorded holograms, the reference light from the objective lens is irradiated to the reflective layer through the recording layer and quarter wavelength plate of the hologram recording medium. Reproduced light is generated from the holograms by the reference light, so that the reference light and reproduced light return toward the objective lens. This reproduced light does not transmit the quarter wavelength plate, so that the direction of the polarization plane is the same as the incident reference light. On the other hand, the reference light transmits and is reflected by the quarter wavelength plate, and again transmits the quarter wavelength plate, so that the direction of the polarization plane is different by 90° from that of the reproduced light. In other words, the reflected reference light returning to the objective lens differs from the reproduced light in the direction of the polarization plane. An optical path is formed of a separating part such as a polarization beam splitter such that the reproduced light alone impinges on the image sensor for receiving the reproduced light. In this way, the configuration of the pickup including the objective lens is simplified, and since the reference light does not impinge on the image sensor for receiving the reproduced light, the S/N ratio of the reproduced signal is increased to improve the hologram reading capability.

<Hologram Reproducing System in Other Embodiments>

Figure 24:
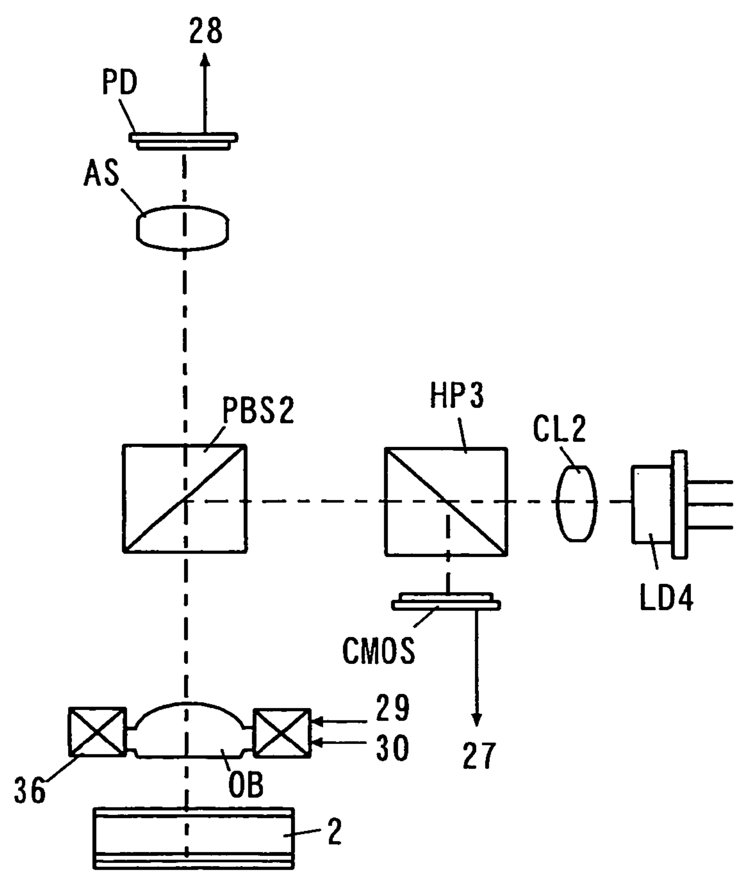
FIG. 24 is a schematic diagram generally showing a pickup of a reproducing apparatus for reproducing information from a hologram disc according to another embodiment of the present invention.

FIG. 24 shows an example of a pickup in a hologram reproducing system for reproducing a signal from holograms (diffraction grating area) previously recorded in accordance with information to be recorded in a recording layer of a hologram recording medium. This hologram reproducing system is identical in configuration to FIG. 18 except that main components of the recording optical system (the third laser source LD3 at a wavelength for recording holograms, first collimator lens CL1, first half mirror HP1, first dichroic polarization beam splitter PBS11, polarization spatial light modulator PSLM, and dichroic prism DP) are excluded. The hologram reproducing system has a reproduction optical system and a servo system which include a fourth laser source LD4, a second collimator lens CP2, a third half mirror HP3, a reproduced signal detector including an image sensor CMOS, a second polarization beam splitter PBS2, an astigmatism element AS, a photodetector PD, an objective lens OB, and an objective lens actuator 36 for driving the objective lens OB.

Specifically, the hologram reproducing system has, other than the main components of the recording optical system, a support for mountably supporting a hologram recording medium; a light source for generating a coherent reference beam; an interference unit for irradiating the reference beam to a diffraction grating area formed inside a recording layer of the hologram recording medium in accordance with recorded information to generate a reproduced wave; a separator for separating the reproduced wave from return light of the reference beam reflected from the reflective laser source to the interference unit; and a detector for detecting recorded information formed by the reproduced wave.

In a reproducing operation of the hologram reproducing system, an S-polarized light beam from the fourth laser source LD4 passes through the third half mirror HP3, is reflected by the second polarized beam splitter PBS2 and converged by the objective lens OB, and impinges on the hologram disc 2 without changing from the S-polarized light.

Since reproduced light generated from the hologram disc 2 is S-polarized light, a component which transmits the objective lens OB, is reflected by the second polarization beam splitter PBS2, and reflected by the third half mirror HP3 impinges on the image sensor CMOS. The image sensor CMOS delivers an output corresponding to an image formed by the reproduced light to the reproduced signal processing circuit 27 which generates a reproduced signal that is supplied to the controller circuit 50 for reproducing recorded page data.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2003-409766 which is hereby incorporated by reference.

What is claimed is:

1. A hologram recording medium which is irradiated with light for recording information thereon and reproducing information therefrom, comprising:

a recording layer made of a photo-sensitive material;

a reflective layer disposed on one side of said recording layer opposite to the side which is irradiated with light; and a quarter wavelength plate interposed between said recording layer and said reflective layer.

2. A hologram recording medium according to claim 1, wherein said quarter wavelength plate has an optical axis which is set at an angle within a predetermined angle range to the direction of a polarization plane of incident light.

3. A hologram recording medium according to claim 1, wherein said substrate is a disc, and said hologram recording medium comprises a plurality of said quarter wavelength plates.

4. A hologram recording medium according to claim 3, wherein said plurality of quarter wavelength plates define a division line extending in a radial direction, and said hologram recording medium has an address area or a servo area on said division line.

5. A hologram recording medium according to claim 3, wherein said reflective layer has a guide track traced by a spot of a light beam passing through said recording layer and said quarter wavelength plate from said objective lens and being converged.

6. A hologram recording medium according to claim 3, wherein said guide track is formed on said substrate spirally or spiroarcually or concentrically with respect to the center of said substrate.

7. A hologram recording medium according to claim 1, wherein said guide track is formed in parallel on said substrate.

8. A hologram recording medium according to claim 1, further comprising a separation layer laminated between said reflective layer and said recording layer.

9. A hologram recording medium according to claim 1, wherein said quarter wavelength plate is separated from the recording layer by a space.

10. A hologram recording and reproducing system comprising:

a hologram recording medium having a recording layer made of a photo-sensitive material capable of preserving an optical interference pattern, a reflective layer disposed on the opposite side of said recording layer from a side on which a light beam impinges, and a quarter wavelength plate interposed between said recording layer and said reflective layer;

a support for mountably supporting said hologram recording medium;

a light source for generating a coherent reference beam;

a signal light generator including a spatial light modulator for spatially modulating the reference beam in accordance with recording information to generate a signal beam;

an interference unit for irradiating said reflective layer of said hologram recording medium with the signal beam and the reference beam to form a diffraction grating area by a light interference pattern within said recording layer of said hologram recording medium, and for irradiating the reference beam to the diffraction grating area to generate a reproduced wave corresponding to the signal beam;

a separator for separating said reproduced wave from return light of the reference light reflected from said reflective layer back to said interference unit; and a detector for detecting recorded information formed by the reproduced wave.

11. A hologram recording and reproducing system according to claim 10, wherein said light source comprises separate light sources for emitting the signal beam and the reference beam, respectively.

12. A hologram reproducing system comprising:

a hologram recording medium having a recording layer made of a photo-sensitive material capable of preserving an optical interference pattern, a reflective layer disposed on the opposite side of said recording layer from a side on which a light beam impinges, and a quarter wavelength plate interposed between said recording layer and said reflective layer;

a support for mountably supporting said hologram recording medium;

a light source for generating a coherent reference beam;

an interference unit for irradiating the reference beam to a diffraction grating area formed within said recording layer of said hologram recording medium in accordance with recording information to generate a reproduced wave corresponding to the signal beam;

a separator for separating said reproduced wave from return light of the reference light reflected from said reflective layer back to said interference unit; and a detector for detecting recorded information formed by the reproduced wave.

13. A hologram recording system comprising:

a hologram recording medium having a recording layer made of a photo-sensitive material capable of preserving an optical interference pattern, a reflective layer disposed on the opposite side of said recording layer from a side on which a light beam impinges, and a quarter wavelength plate interposed between said recording layer and said reflective layer;

a support for mountably supporting said hologram recording medium;

a light source for generating a coherent reference beam;

a signal light generator including a spatial light modulator for spatially modulating the reference beam in accordance with recording information to generate a signal beam; and an interference unit for irradiating said reflective layer of said hologram recording medium with the signal beam and the reference beam to form a diffraction grating area by a light interference pattern within said recording layer of said hologram recording medium.

* * * * *